(12) United States Patent
Gutmann et al.

(10) Patent No.: US 12,005,897 B1
(45) Date of Patent: *Jun. 11, 2024

(54) SPEED PLANNING FOR AUTONOMOUS VEHICLES

(71) Applicant: Waymo LLC, Mountain View, CA (US)

(72) Inventors: Jens-Steffen Ralf Gutmann, Cupertino, CA (US); Vadim Furman, Los Gatos, CA (US); Tobias Kunz, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,985

(22) Filed: Feb. 21, 2023

Related U.S. Application Data

(63) Continuation of application No. 16/831,980, filed on Mar. 27, 2020, now Pat. No. 11,608,060, which is a continuation of application No. 15/258,324, filed on Sep. 7, 2016, now Pat. No. 10,640,111.

(51) Int. Cl.
*B60W 30/14* (2006.01)
*B60W 60/00* (2020.01)

(52) U.S. Cl.
CPC ...... *B60W 30/143* (2013.01); *B60W 60/0027* (2020.02)

(58) Field of Classification Search
None
See application file for complete search history.

(56) References Cited

U.S. PATENT DOCUMENTS

| 8,412,449 B2 | 4/2013 | Trepagnier et al. |
| 8,473,144 B1 | 6/2013 | Dolgov et al. |
| 8,676,466 B2 | 3/2014 | Mudalige |

(Continued)

FOREIGN PATENT DOCUMENTS

WO 2017087199 A1 5/2017

OTHER PUBLICATIONS

"International Search Report and Written Opinion received for PCT Patent Application No. PCT/US2018/062044, dated Mar. 14, 2019", 7 pages.

(Continued)

*Primary Examiner* — David P. Merlino
(74) *Attorney, Agent, or Firm* — Botos Churchill IP Law

(57) ABSTRACT

Aspects of the disclosure relate to identifying and adjusting speed plans for controlling a vehicle in an autonomous driving mode. In one example, an initial speed plan for controlling speed of the vehicle for a first predetermined period of time corresponding to an amount of time along a route of the vehicle is identified. Data identifying an object and characteristics of that object is received from a perception system of the vehicle. A trajectory for the object that will intersect with the route at an intersection point at particular point in time is predicted using the data. A set of constraints is generated based on at least the trajectory. The speed plan is adjusted in order to satisfy the set of constraints for a second predetermined period of time corresponding to the amount of time. The vehicle is maneuvered in the autonomous driving mode according to the adjusted speed plan.

24 Claims, 9 Drawing Sheets

(56) References Cited

U.S. PATENT DOCUMENTS

| | | |
|---|---|---|
| 8,712,663 B1 | 4/2014 | Zeng |
| 8,781,669 B1 | 7/2014 | Teller et al. |
| 8,788,134 B1 | 7/2014 | Litkouhi et al. |
| 8,838,337 B2 | 9/2014 | Ueda et al. |
| 8,930,058 B1 | 1/2015 | Quist |
| 9,014,905 B1 | 4/2015 | Kretzschmar et al. |
| 9,244,462 B2 | 1/2016 | Pedersen |
| 9,248,834 B1 | 2/2016 | Ferguson et al. |
| 9,254,846 B2 | 2/2016 | Dolgov et al. |
| 9,494,439 B1 | 11/2016 | Ross et al. |
| 10,627,825 B2 | 4/2020 | Gutmann et al. |
| 10,967,861 B2 | 4/2021 | Kunz |
| 2004/0030499 A1 | 2/2004 | Knoop et al. |
| 2006/0273922 A1 | 12/2006 | Bhogal et al. |
| 2009/0319112 A1 | 12/2009 | Fregene et al. |
| 2010/0106356 A1 | 4/2010 | Trepagnier et al. |
| 2010/0204896 A1 | 8/2010 | Biondo et al. |
| 2010/0312434 A1 | 12/2010 | Schutyser et al. |
| 2011/0184605 A1 | 7/2011 | Neff |
| 2012/0083960 A1* | 4/2012 | Zhu ................ G06V 20/58 701/23 |
| 2012/0218093 A1 | 8/2012 | Yoshizawa et al. |
| 2013/0197758 A1 | 8/2013 | Ueda et al. |
| 2015/0224845 A1 | 8/2015 | Anderson et al. |
| 2015/0291216 A1 | 10/2015 | Sato |
| 2015/0346723 A1 | 12/2015 | Pedersen |
| 2016/0023656 A1 | 1/2016 | Matsumura |
| 2016/0200317 A1 | 7/2016 | Danzl et al. |
| 2016/0288788 A1 | 10/2016 | Nagasaka et al. |
| 2016/0318513 A1 | 11/2016 | Lee |
| 2017/0010618 A1 | 1/2017 | Shashua et al. |
| 2017/0039855 A1 | 2/2017 | Maeda et al. |
| 2017/0057507 A1 | 3/2017 | Gordon et al. |
| 2017/0090478 A1 | 3/2017 | Blayvas |
| 2017/0113686 A1 | 4/2017 | Horita et al. |
| 2017/0120902 A1 | 5/2017 | Kentley et al. |
| 2017/0131719 A1 | 5/2017 | Micks et al. |
| 2017/0132334 A1* | 5/2017 | Levinson ............ G05D 1/0088 |
| 2017/0136842 A1 | 5/2017 | Anderson et al. |
| 2017/0210379 A1* | 7/2017 | Obata ................ B60W 30/143 |
| 2017/0329332 A1 | 11/2017 | Pilarski et al. |
| 2018/0004211 A1 | 1/2018 | Grimm et al. |
| 2018/0032079 A1 | 2/2018 | Nishi |
| 2018/0032082 A1 | 2/2018 | Shalev-Shwartz |
| 2018/0141568 A1 | 5/2018 | Singhal et al. |
| 2018/0162409 A1 | 6/2018 | Altmannshofer et al. |
| 2018/0197415 A1 | 7/2018 | Kurata |
| 2018/0326980 A1 | 11/2018 | He |
| 2019/0025067 A1 | 1/2019 | Bärecke et al. |
| 2019/0056743 A1 | 2/2019 | Alesiani |
| 2019/0064813 A1 | 2/2019 | Binet et al. |
| 2019/0072973 A1 | 3/2019 | Sun et al. |
| 2019/0286154 A1 | 9/2019 | Shalev-Shwartz et al. |
| 2019/0286157 A1 | 9/2019 | Shalev-Shwartz et al. |
| 2019/0291726 A1 | 9/2019 | Shalev-Shwartz et al. |

OTHER PUBLICATIONS

Glaser, et al., "Maneuver Based Trajectory Planning for Highly Autonomous Vehicles on Real Road With Traffic and Driver Interaction", Submitted to IEEE Transaction on Intelligent Transportation System, May 10, 2010, 15 pages.

* cited by examiner

SPEED PLANNING FOR AUTONOMOUS VEHICLES

CROSS REFERENCE TO RELATED APPLICATIONS

The present application is a continuation of U.S. patent application Ser. No. 16/831,980, filed Mar. 27, 2020, which is a continuation of U.S. patent application Ser. No. 15/258,324, filed Sep. 7, 2016, now U.S. Pat. No. 10,640,111 issued on May 5, 2020, the entire disclosures of which are incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

Such vehicles are typically equipped with various types of sensors in order to detect objects in the surroundings. For example, autonomous vehicles may include lasers, sonar, radar, cameras, and other devices which scan and record data from the vehicle's surroundings. Sensor data from one or more of these devices may be used to detect objects and their respective characteristics (position, shape, heading, speed, etc.). These characteristics can be used to predict what an object is likely to do for some brief period into the future which can be used to control the vehicle in order to avoid these objects. Thus, detection, identification, and prediction are critical functions for the safe operation of autonomous vehicle.

BRIEF SUMMARY

Aspects of the disclosure relate to a method of maneuvering a vehicle in an autonomous driving mode. The method includes identifying, by one or more processors, an initial speed plan for controlling speed of the vehicle for a first predetermined period of time corresponding to an amount of time along a route of the vehicle; receiving, by the one or more processors, from a perception system of the vehicle, data identifying an object and characteristics of that object; predicting, by the one or more processors, a trajectory for the object that will intersect with the route at an intersection point at particular point in time using the data; generating, by the one or more processors, a set of constraints based on at least the trajectory; adjusting, by the one or more processors, the initial speed plan in order to satisfy the set of constraints for a second predetermined period of time corresponding to the amount of time; and maneuvering, by the one or more processors, the vehicle in the autonomous driving mode according to the adjusted initial speed plan.

In one example, the initial speed plan corresponds to a previously adjusted initial speed plan such that the initial speed plan is adjusted as an iterative process. In another example, the initial speed plan corresponds to a maximum speed of the vehicle defined by a fixed limit on the speed of the vehicle for a power system of the vehicle. In another example, the initial speed plan corresponds to a maximum speed of the vehicle defined by a legal speed limit on the speed of the vehicle for a roadway on which the vehicle is currently located. In another example, a constraint of the set of constraints includes constraint that the vehicle should not be within a predetermined distance of the intersection point at the particular point in time. In another example, the method also includes determining a status of a traffic signal, and wherein generating a constraint of the set of constraints is based on the determined status. In another example, the method also includes receiving from the perception system of the vehicle, second data identifying a second object and characteristics of the second object including a speed of the second object, wherein the second object corresponds to a road user; predicting a second trajectory of the second object that indicates that the vehicle will pass the second object; and the set of constraints includes a constraint that limits the speed of the vehicle relative to the speed of the second object when the vehicle passes the second object. In another example, the method also includes receiving from the perception system of the vehicle, second data identifying a second object and characteristics of the second object including a signal of the second object, wherein the second object corresponds to a road user, and wherein generating the set of constraints includes generating a first constraint of the set of constraints based on the signal of the second object. In this example, the method also includes adjusting the adjusted initial speed plan to generate a speed plan based on the first constraint where the signal does not persist while the speed plan is being generated, and wherein the signal is a hand signal and the second object is a bicyclist. In another example, a constraint of the set of constraints includes a deceleration limit corresponding to a mechanical limit of deceleration for the vehicle. In another example, a constraint of the set of constraints includes a deceleration limit for the vehicle corresponding to a level of deceleration likely to be comfortable to a passenger. In another example, a constraint of the set of constraints includes a headway distance limit between the vehicle and the object corresponding to a distance likely to be comfortable to a passenger. In another example, a constraint of the set of constraints includes a lateral gap distance limit between the vehicle and the object corresponding to a lateral gap distance likely to be comfortable to a passenger.

Another aspect of the disclosure provides a system for maneuvering a vehicle in autonomous driving mode. The system includes one or more processors configured to identify an initial speed plan for controlling speed of the vehicle for a first predetermined period of time corresponding to an amount of time along a route of the vehicle; receive from a perception system of the vehicle, data identifying an object and characteristics of that object; predict a trajectory for the object that will intersect with the route at an intersection point at particular point in time using the data; generate a set of constraints based on at least the trajectory; adjust the initial speed plan in order to satisfy the set of constraints for a second predetermined period of time corresponding to the amount of time; and maneuvering the vehicle in the autonomous driving mode according to the adjusted initial speed plan.

In one example, the initial speed plan corresponds to a previously adjusted initial speed plan such that the initial speed plan is adjusted as an iterative process. In another example, a constraint of the set of constraints includes constraint that the vehicle should not be within a predetermined distance of the intersection point at the particular point in time. In another example, the one or more processors are further configured to determine a status of a traffic signal, and generating a constraint of the set of constraints is based on the status. In another example, a constraint of the set of constraints includes a deceleration limit for the vehicle corresponding to a level of deceleration likely to be comfortable to a passenger. In another example, a constraint of the set of constraints includes a headway distance limit between the vehicle and the object corresponding to a distance likely to be comfortable to a passenger.

A further aspect of the disclosure provides a non-transitory computer readable medium on which instructions are stored. The instructions when executed by one or more processors, cause the one or more processors to perform a method of controlling a vehicle in an autonomous driving mode. The method includes identifying an initial speed plan for controlling speed of the vehicle for a first predetermined period of time corresponding to an amount of time along a route of the vehicle; receiving from a perception system of the vehicle, data identifying an object and characteristics of that object; predicting a trajectory for the object that will intersect with the route at an intersection point at particular point in time using the data; generating a set of constraints based on at least the trajectory; adjusting the initial speed plan in order to satisfy the set of constraints for a second predetermined period of time corresponding to the amount of time; and maneuvering the vehicle according to the adjusted initial speed plan.

DETAILED DESCRIPTION

Overview

Figure 1:
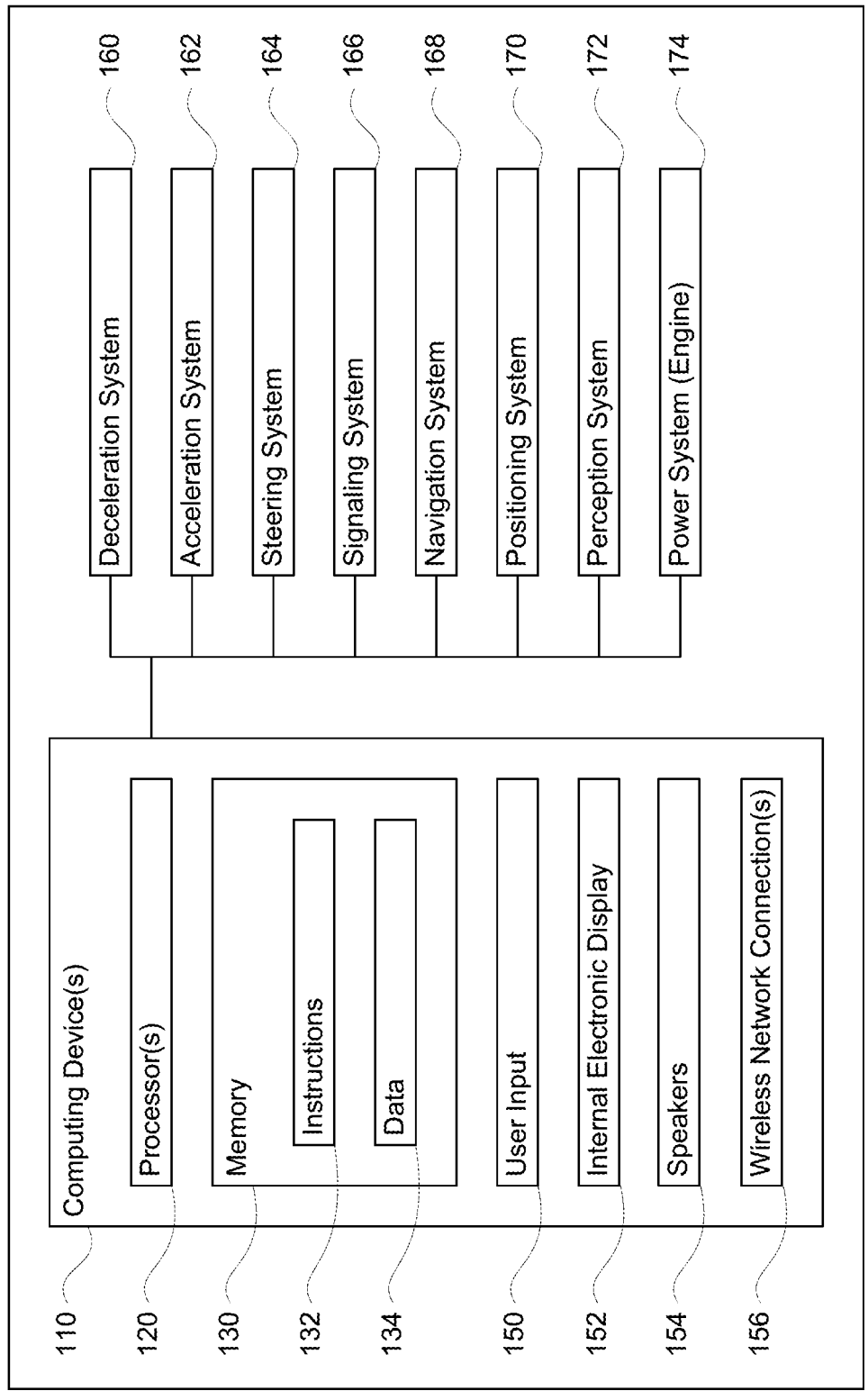
FIG. 1 is a functional diagram of an example vehicle in accordance with an exemplary embodiment.

Aspects of the technology relate to controlling autonomous vehicles. Generally, these vehicles operate by detecting and identifying objects in the vehicle's environment and reacting to those objects. However, in order to control the vehicle safely, the vehicle's computing devices must be able to determine the speed at which to drive the vehicle. To do this, the computing devices may begin with an initial speed plan and adjust that speed plan based on various constraints in real time.

A speed plan may be determined for a predetermined period into the future. The speed plan may define how the vehicle varies its speed over the predetermined period of time. The speed plan may then be used to control the speed of the vehicle, for instance, by adjusting braking and acceleration inputs (i.e. pedals). By computing over the predetermined period of time, the changes in acceleration or "jerk" experienced by a passenger may be reduced.

To determine an initial speed plan, the vehicle's computing devices may first determine a route to a location to which the vehicle will be driven. The initial speed plan may be based on detailed map information defining the geometry of vehicle's expected environment including roadways as well as speed restrictions for those roadways. In addition, the initial speed plan may be based on speed restrictions for the vehicle, for instance, as autonomous vehicles may have speed limit requirements. The initial speed profile may thus be based on a fastest possible speed for the vehicle at various locations along the route for the predetermined period.

The initial speed plan may then be adjusted using a set of constraints. In other words, the fastest possible speed may be reduced in order to satisfy all of the constraints of the set of constraints. Because the process is iterative, satisfying the constraints may also include increasing the speed of the vehicle, presumably within the limits of the vehicle and legal speed limits. The resulting adjusted speed plan may then be used to control the speed of the vehicle.

In some instances, there may be no adjustment to the prior speed plan that will satisfy all of the constraints of the set of constraints. If this occurs, the computing devices may revert to comparing an expected result if the vehicle were to return to the fastest possible speed with an expected result if the vehicle were to come to a complete stop. If the fastest possible speed would allow the vehicle to continue safely, in other words, without coming too close to any other objects or their predicted trajectories (i.e. other vehicles, bicyclists or pedestrians), the prior speed plan may be adjusted back to the fastest possible speed. If not, the vehicle may be brought to a complete stop. In other words, the computing devices may compare the relative penetration between the route and the predicted trajectory of another vehicle and select the option which will cause the least amount of overlap.

As noted above, adjusting the speed plan may be an iterative process. In this regard, the prior speed plan may be used to determine a current speed plan. For instance, once the initial speed plan is adjusted based on an initial set of constraints, the adjust speed plan may thereafter be adjusted on an updated set of constraints using updated predicted trajectories and environmental conditions. In addition, the prior speed plan may be adjusted periodically.

The features described herein not only allow for safe operation of a vehicle, but can also achieve smoother speed transitions than typical methods. By computing over the predetermined period of time and iteratively changing the speed profile, the changes in acceleration or "jerk" experienced by a passenger may be reduced. This allows passengers to feel as if the vehicle is being controlled in a more natural, human-like way.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be an autonomous driving computing system incorporated into vehicle 100. The autonomous driving computing system may be capable of communicating with various components of the vehicle. For example, returning to FIG. 1, computing devices 110 may be in communication with various systems of vehicle 100, such as deceleration system 160, acceleration system 162, steering system 164, signaling system 166, navigation system 168, positioning system 170, and perception system 172 in order to control the movement, speed, etc. of vehicle 100 in accordance with the instructions 132 of memory 130. Again, although these systems are shown as external to computing devices 110, in actuality, these systems may also be incorporated into computing devices 110, again as an autonomous driving computing system for controlling vehicle 100.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Figure 2:
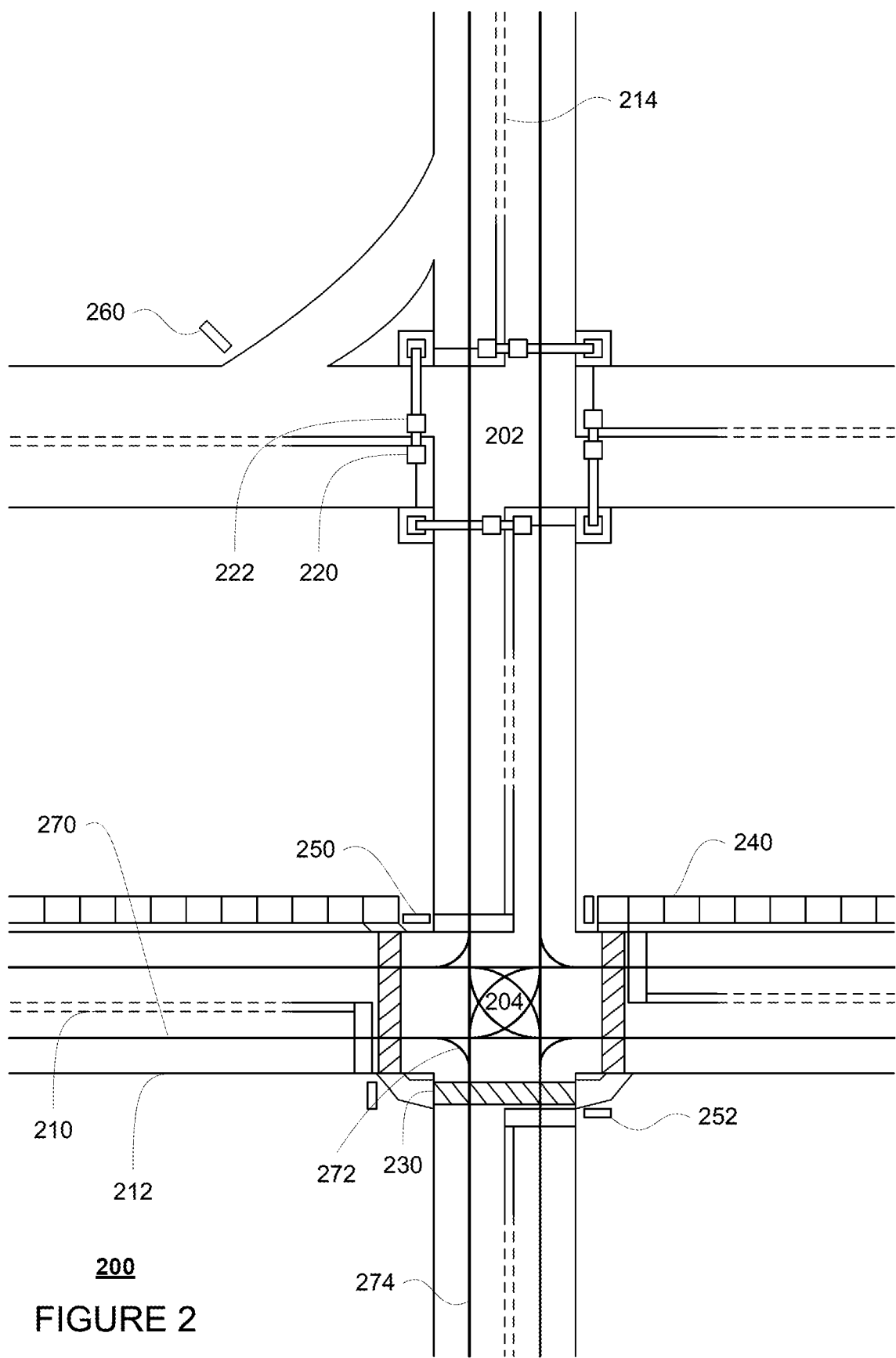
FIG. 2 is a diagram of map information in accordance with an exemplary embodiment.
Figure 3A:
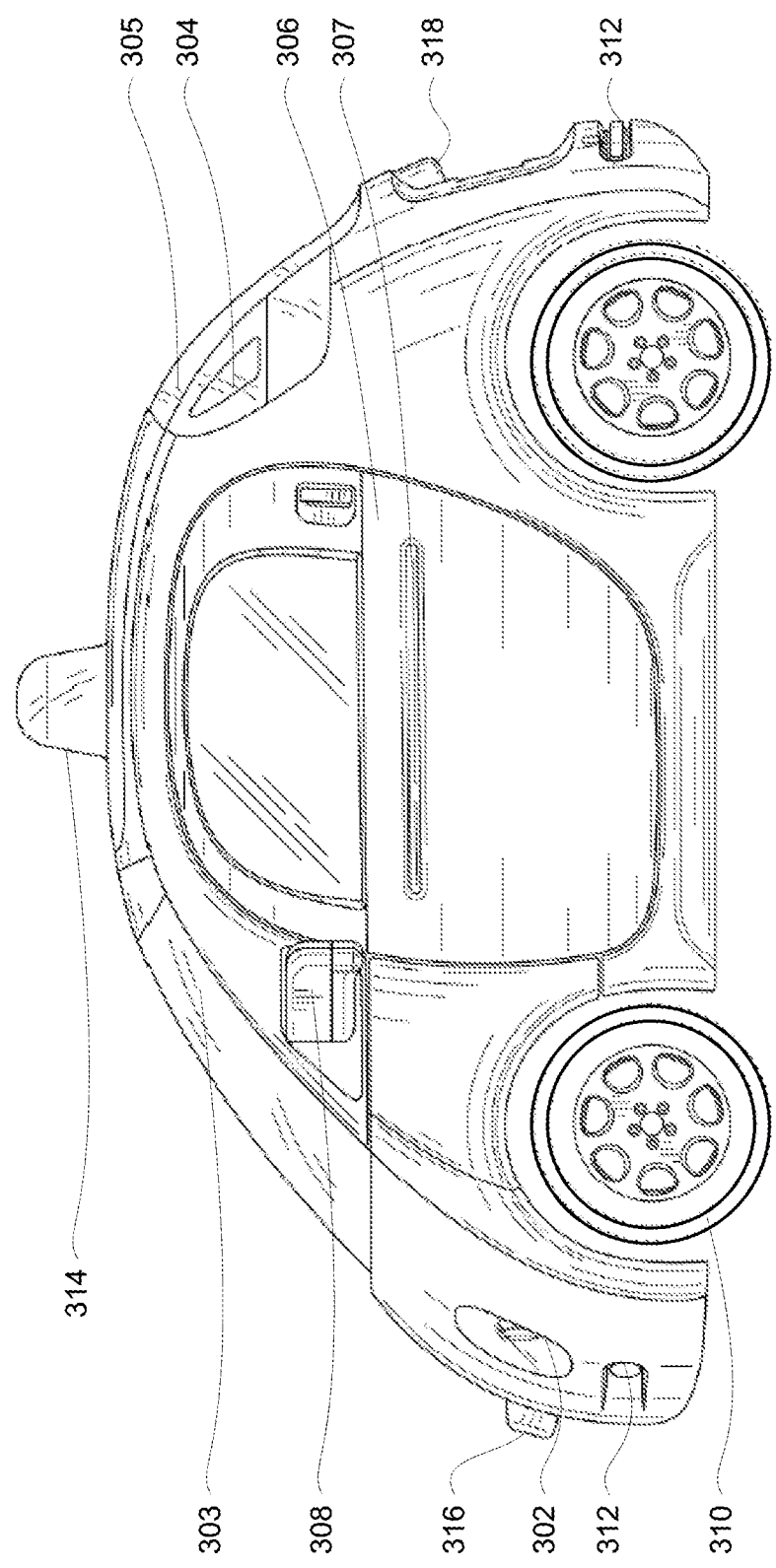
FIGS. 3A-3D are example external views of a vehicle in accordance with aspects of the disclosure.
Figure 3C:
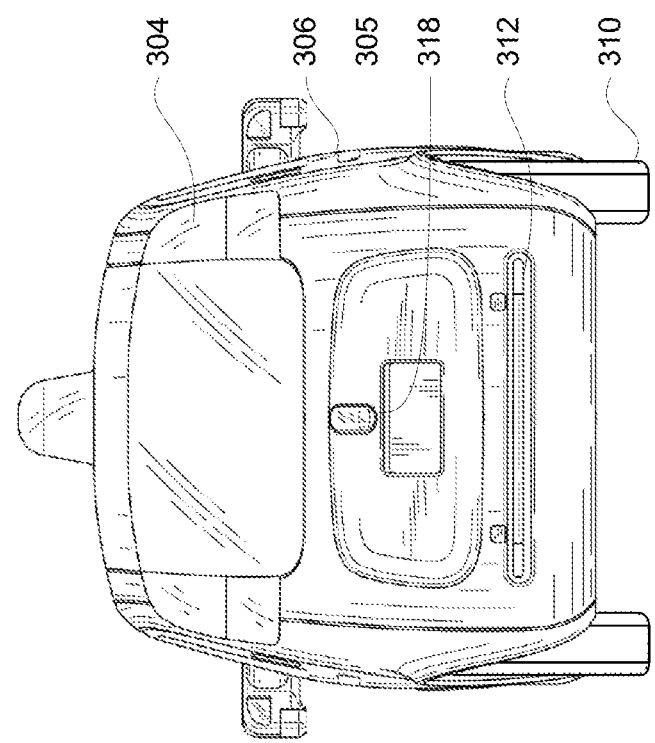
Figure 3B:
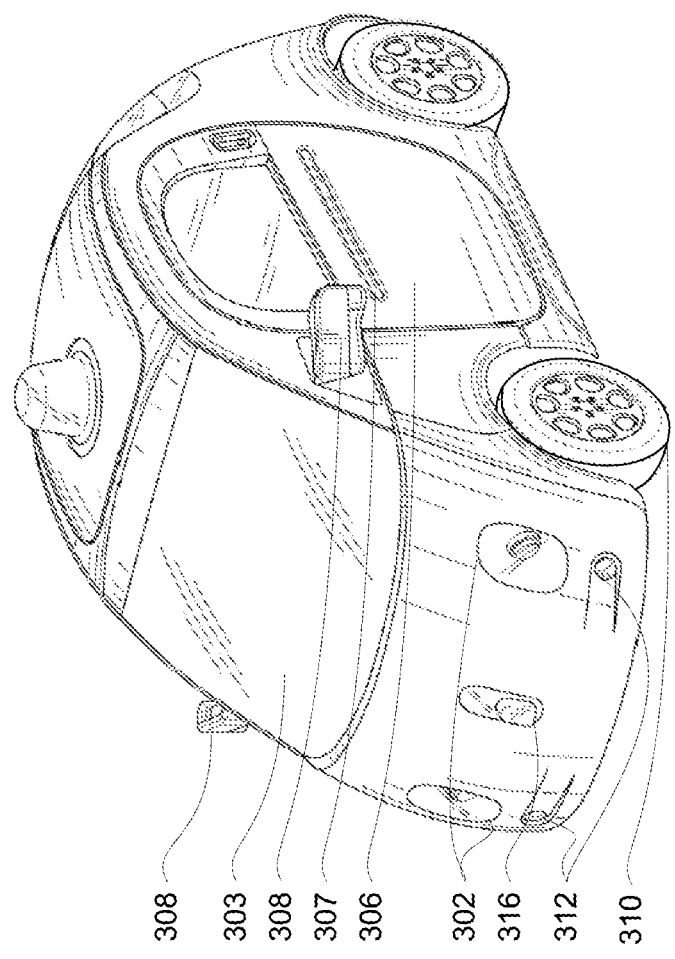
Figure 3D:
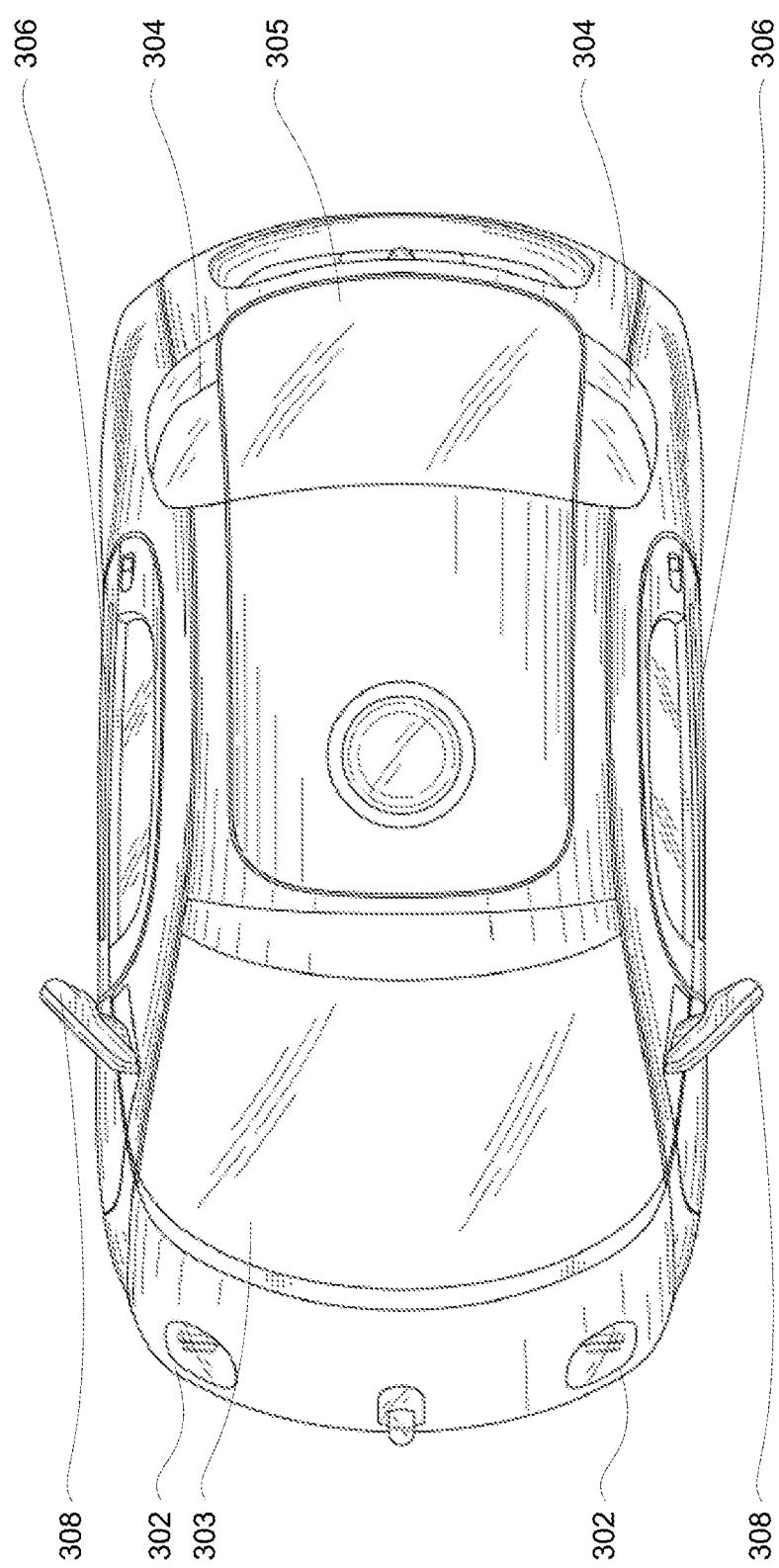

Navigation system 168 may be used by computing devices 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways FIG. 2 is an example of map information 200 for a section of roadway including intersections 202 and 204. In this example, the map information 200 includes information identifying the shape, location, and other characteristics of lane lines 210, 212, 214, traffic signal lights 220, 222, crosswalk 230, sidewalks 240, stop signs 250, 252, and yield sign 260. Areas where the vehicle can drive may be associated with one or more rails 270, 272, and 274 which indicate the location and direction in which a vehicle should generally travel at various locations in the map information. For example, a vehicle may follow rail 270 when driving in the lane between lane lines 210 and 212, and may transition to rail 272 in order to make a right turn at intersection 204. Thereafter the vehicle may follow rail 274. Of course, given the number and nature of the rails only a few are depicted in map information 200 for simplicity and ease of understanding.

Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing devices 110. In the case where the vehicle is a small passenger vehicle such as a car, the car may include a laser or other sensors mounted on the roof or other convenient location. For instance, a vehicle's perception system may use various sensors, such as LIDAR, sonar, radar, cameras, etc. to detect objects and their characteristics such as location, orientation, size, shape, type, direction and speed of movement, etc. The raw data from the sensors and/or the aforementioned characteristics can be quantified or arranged into a descriptive function or vector for processing by the computing devices 110. As discussed in further detail below, computing devices 110 may use the positioning system 170 to determine the vehicle's location and perception system 172 to detect and respond to objects when needed to reach the location safely.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated the signaling system 166. Light bar 307 may also be associated with the signaling system 166.

Vehicle 100 also includes sensors of the perception system 172. For example, housing 314 may include one or more laser devices for having 360 degree or narrower fields of view and one or more camera devices. Housings 316 and 318 may include, for example, one or more radar and/or sonar devices. The devices of the perception system 172 may also be incorporated into the typical vehicle components, such as taillights/turn signal lights 304 and/or side view mirrors 308. Each of these radar, camera, and lasers devices may be associated with processing components which process data from these devices as part of the perception system 172 and provide sensor data to the computing devices 110.

Data 134 may store various behavior-time models for predicting an objects future behavior for a pre-determined period of time, such as the next 10 seconds or more or less. In one example, the behavior-time models may be configured to use data for an object received from the perception system 172, and in particular another road user, including the road user's characteristics as well as additional contextual information discussed in further detail below. As an example, given the location, heading, speed, and other characteristics included in the data from the perception system 172, the behavior-time models may provide a set of one or more predictions for how the object could behave for the predetermined period of time as well as a corresponding likelihood value for each prediction. The predictions may include a trajectory, for instance, defining a set of future locations where the object is expected to be at various times in the future corresponding to the predetermined period of time. The likelihood values may indicate which of the predictions are more likely to occur (relative to one another). In this regard, the prediction with the greatest likelihood value may be the most likely to occur whereas predictions with lower likelihood values may be less likely to occur.

Thus, the behavior-time models may be configured to generate a set of possible hypotheses for what a particular road user will do over a particular horizon or predetermined period of time (e.g. 10 seconds) and relative likelihoods for each hypothesis. These models may be trained using data about how an object observed at that location behaved in the past, intuition, etc., and may also be specifically designated for particular types of objects, such as vehicles, pedestrians, motorcycles, bicyclists, etc. The computing devices 110 can then reason about hypotheses that interact with the vehicle's trajectory and are of a sufficient likelihood to be worth considering.

The computing devices 110 may control the direction and speed of the vehicle by controlling various components. By way of example, computing devices 110 may navigate the vehicle to a destination location completely autonomously using data from the detailed map information and navigation system 168. In order to maneuver the vehicle, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between a power system 174 (for instance, a gas or electric engine) of the vehicle and the wheels of the vehicle. Again, by controlling these systems, computing devices 110 may also control the drivetrain of the vehicle in order to maneuver the vehicle autonomously.

Figure 4:
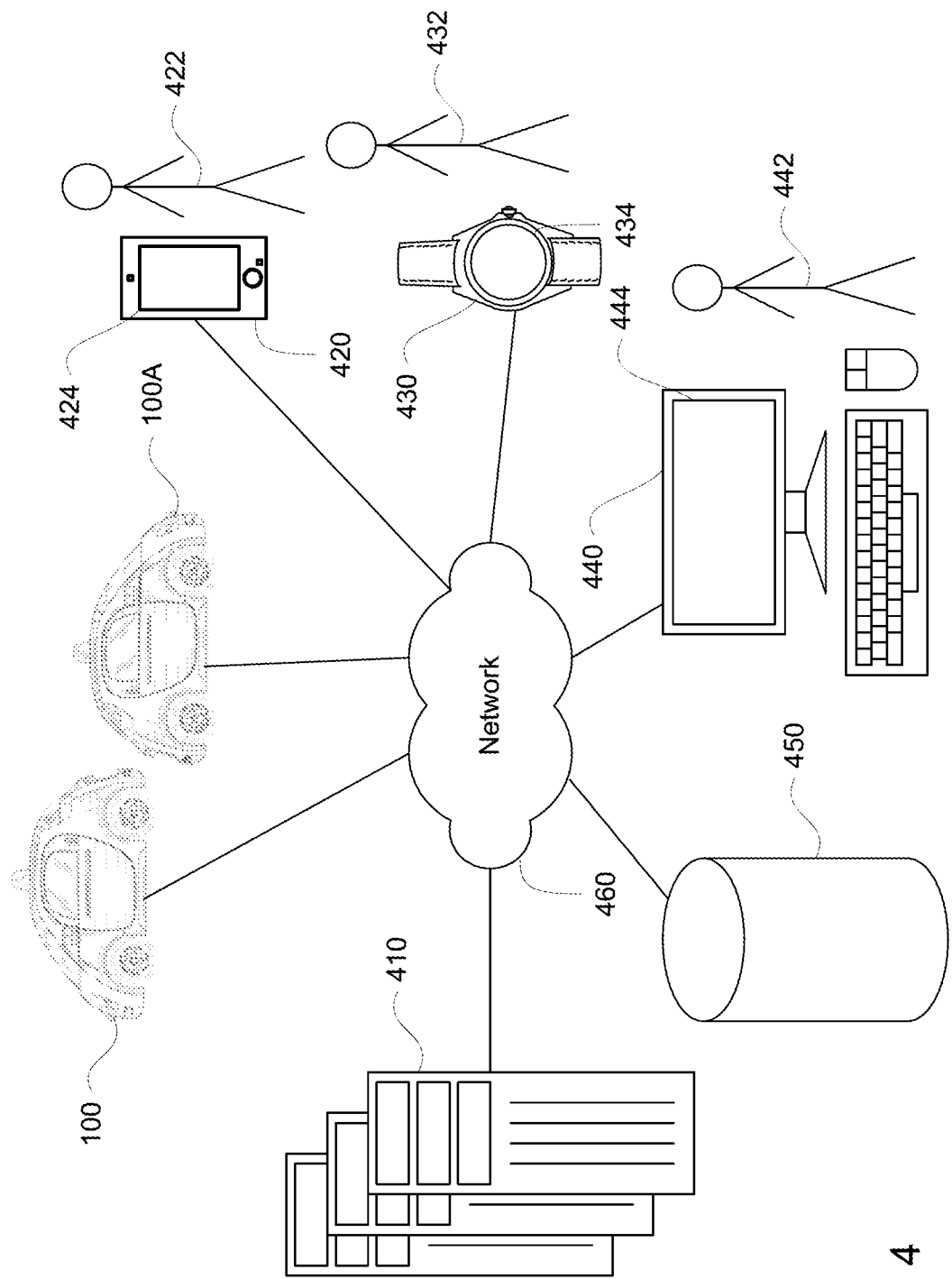
FIG. 4 is a pictorial diagram of a system in accordance with aspects of the disclosure.
Figure 5:
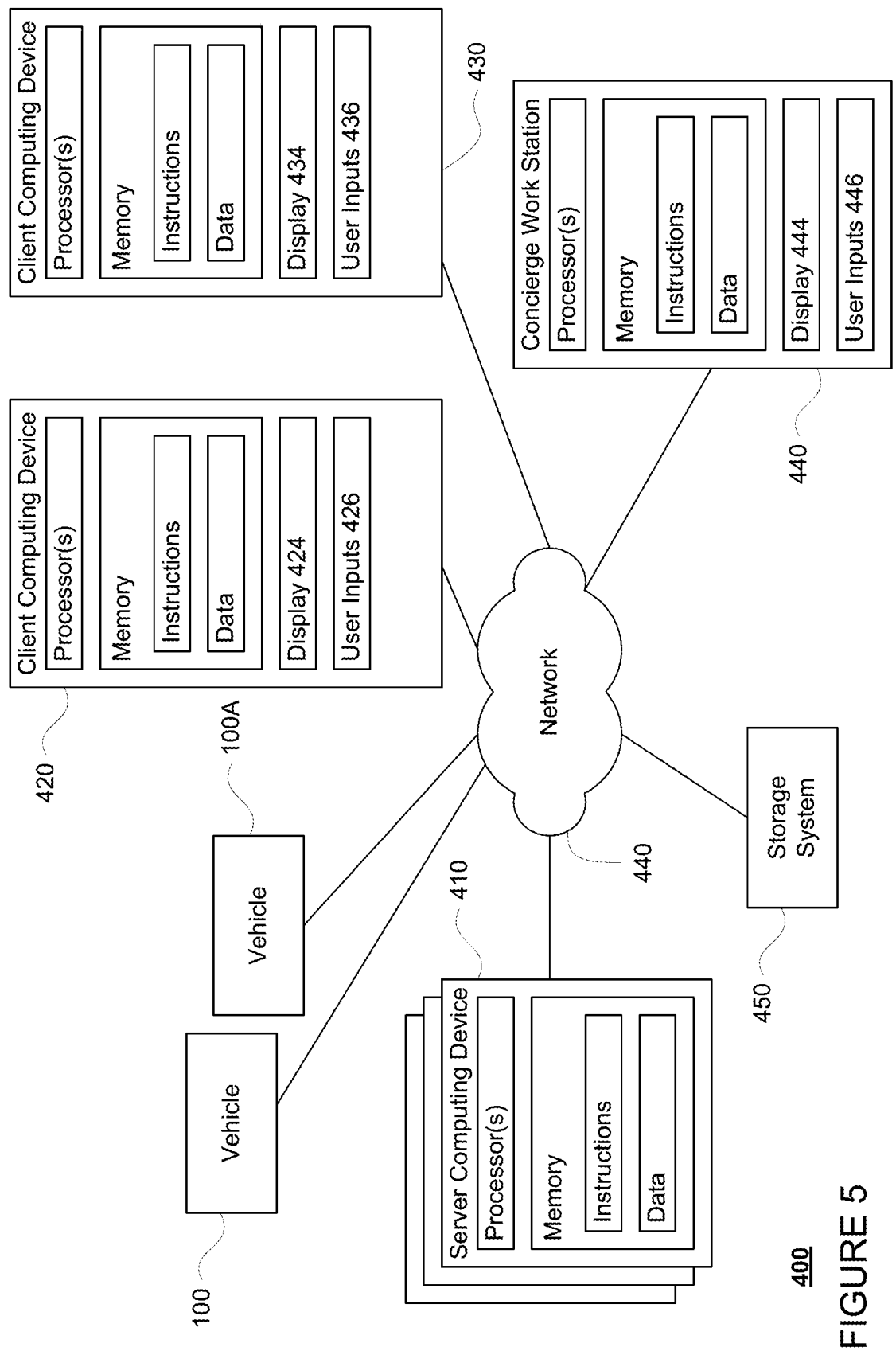
FIG. 5 is a functional diagram of the system of FIG. 4 in accordance with aspects of the disclosure.

The one or more computing devices 110 of vehicle 100 may also receive or transfer information to and from other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing devices 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include a server having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with one or more computing devices 110 of vehicle 100 or a similar computing device of vehicle 100A as well as client computing devices 420, 430, 440 via the network 460. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touch-screen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, laptop, or a netbook that is capable of obtaining information via the Internet or other networks. In another example, client computing device 430 may be a wearable computing device, such as a "smart watch" as shown in FIG. 4. As an example the user may input information using a keyboard, a keypad, a multi-function input button, a microphone, visual signals (for instance, hand or other gestures) with a camera or other sensors, a touch screen, etc.

In some examples, client computing device 440 may be concierge work station used by an administrator to provide concierge services to users such as users 422 and 432. For example, user 442 may be a concierge that uses concierge work station 440 to communicate via a telephone call or audio connection with users through their respective client computing devices or vehicles 100 or 100A in order to ensure the safe operation of vehicles 100 and 100A and the safety of the users as described in further detail below. Although only a single concierge work station 440 is shown in FIGS. 4 and 5, any number of such work stations may be included in a typical system.

Storage system 450 may store various types of information. This information may be retrieved or otherwise accessed by a server computing device, such as one or more server computing devices 410, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 422 and 432 may download the application via a link in an email, directly from a website, or an application store to client computing devices 420 and 430. For example, client computing device may transmit a request for the application over the network, for example, to one or more server computing devices 410, and in response, receive the application. The application may be installed locally at the client computing device.

The user may then use his or her client computing device to access the application and request a vehicle. As an example, a user such as user 432 may use client computing device 430 to send a request to one or more server computing devices 410 for a vehicle. The request may include information identifying a pickup location or area and/or a destination location or area. In response the one or more server computing devices 410 may identify and dispatch, for example based on availability and location, a vehicle to the pickup location. This dispatching may involve sending information to the vehicle identifying the user (and/or the user's client device) in order to assign the vehicle to the user (and/or the user's client computing device), the pickup location, and the destination location or area.

Once the vehicle 100 receives the information dispatching the vehicle, the vehicle's one or more computing devices 110 may maneuver the vehicle to the pickup location using the various features described above. Once the user, now passenger, is safely in the vehicle, the computing devices 110 may initiate the necessary systems to control the vehicle autonomously along a route to the destination location. For instance, the navigation system 168 may use the map information of data 134 to determine a path or route to the destination location that follows a set of connected rails of map information 200. The computing devices 110 may then maneuver the vehicle autonomously (or in an autonomous driving mode) as described above along the route towards the destination.

Figure 6:
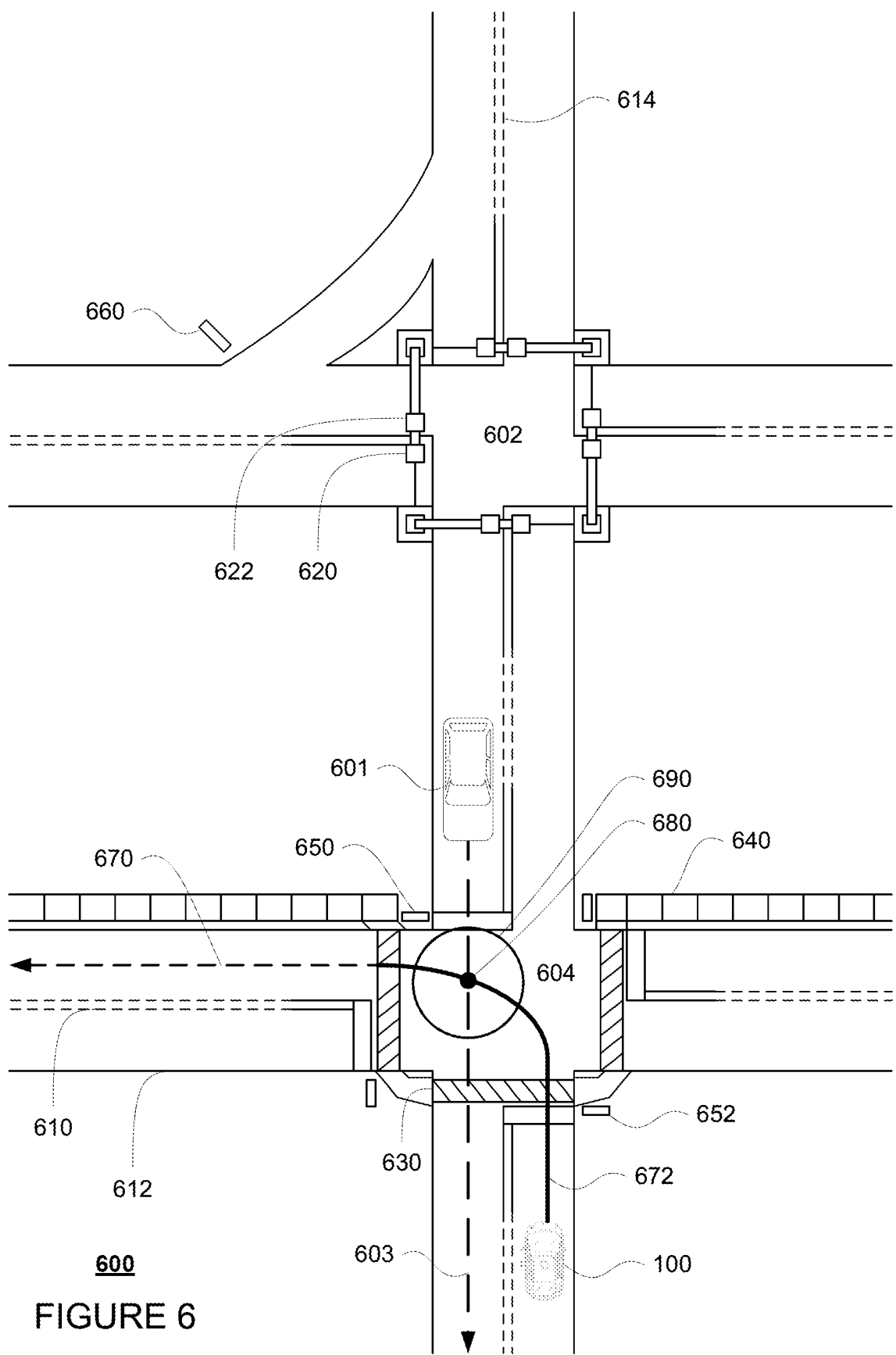
FIG. 6 is a view of a section of roadway in accordance with aspects of the disclosure.

For instance, FIG. 6 depicts vehicle 100 being maneuvered on a section of roadway 600 including intersections 602 and 604. In this example, intersections 602 and 604 correspond to intersections 202 and 204 of the map information 200, respectively. In this example, lane lines 610, 612, and 614 correspond to the shape, location, and other characteristics of lane lines 210, 212, and 214, respectively. Similarly, crosswalk 630 corresponds to the shape, location, and other characteristics of crosswalk 230, respectively; sidewalks 640 correspond to sidewalks 240; traffic signal lights 620, 622 correspond to traffic signal lights 220, 222, respectively; stop signs 650, 652 correspond to stop signs 250, 252, respectively; and yield sign 660 corresponds to yield sign 260. In this example, the computing devices 110 have used map information 200 to determine a route 670 for vehicle 100 to follow in order to reach a destination (not shown).

In order to control the vehicle safely, the computing devices 110 may generate an initial speed plan. A speed plan may be determined for a predetermined period into the future, such as 15 seconds or more or less. The speed plan may define how the vehicle varies its speed (accelerates, decelerates, continues) over the predetermined period of time. For instance, the speed of a vehicle may remain continuous for the 15 seconds or accelerate/decelerate for at least some portion of the 15 seconds. The speed plan may then be used to control the speed of the vehicle, for instance, by adjusting braking and acceleration inputs (i.e. pedals). By computing over the predetermined period of time, the changes in acceleration or "jerk" experienced by a passenger may be reduced.

To determine an initial speed plan, the vehicle's computing devices may first determine the route to the location to which the vehicle will be driven. This location may be, for instance, a destination location selected by a passenger or designated by an operator for cargo. The initial speed plan may be based on the detailed map information defining the geometry of vehicle's expected environment as the vehicle maneuvers along the route.

In addition, the initial speed plan may be based on speed restrictions for the vehicle, for instance, as autonomous vehicles may have physical speed limits (i.e. only so much power can be generated by the power system 174) and/or legal speed limit requirements (i.e. the vehicle must be driven at, no faster than, or below 25 miles per hour, etc.). In one example, the initial speed plan may thus be based on a fastest possible speed for the vehicle at various locations along the route for the predetermined period. For instance, returning to FIG. 6, the initial speed plan for vehicle 100 may include maneuvering along portion 672 (the solid portion of route 670) of route 670 at 25 miles per hour (the legal speed requirement for vehicle 100) for the next 15 seconds.

The initial speed plan may then be adjusted using a set of constraints. In other words, the fastest possible speed may be reduced in order to satisfy all of the constraints of the set of constraints. The adjusted initial speed plan may thereafter be adjusted based on a new set of constraints such that the process is iterative. In this regard, a prior speed plan may be used to determine a current speed plan (or next speed plan as the case may be). For instance, once the initial speed plan is adjusted based on an initial set of constraints, the adjust speed plan may thereafter be adjusted on an updated set of constraints using updated predicted trajectories and environmental conditions. In addition, the prior speed plan may be adjusted periodically, for instance every 0.1 second (1/10 second) or more or less.

Because the process is iterative, satisfying the constraints may also include increasing the speed of the vehicle, presumably within the physical limits of the vehicle (i.e. the acceleration system 162, deceleration system 160, and or power system 174) and legal speed limits. However, in most cases, the constraints may cause the vehicle to be slowed down. The resulting adjusted speed plan may then be used by the computing devices 110 to control the speed of the vehicle 100.

In one example, a constraint of the set of constraints may be based on the predicted trajectories of other objects detected in the vehicle's environment. For instance, when an object is detected, its speed, orientation, type, and other characteristics may be used to generate a prediction of where that object is likely to travel for a brief period of time into the future. Where that predicted trajectory crosses and/or comes within a predetermined distance of the route at some particular point in time, the predicted trajectory may be used to generate a constraint to avoid a particular location at a particular point in time.

As noted above, as the vehicle is being maneuvered by the computing device 110, the perception system 172 may provide the computing devices with information about objects, including other road users, detected in the vehicle's environment. For instance, FIG. 6 depicts vehicle 100 approaching intersection 604 in order to make a left turn. The perception system 172 may provide the computing device 110 with information about vehicle 601 such as its type, location, heading, velocity, etc.

The raw data and/or characteristics of objects received from the perception system may be used with contextual information as input to a behavior-time model of data 134 to make a prediction about what other objects are going to do for the predetermined period of time. For instance, information such as the object's type, location, recent motion heading, acceleration, and velocity may be combined with other information such as where the object is in the world using the detailed map information discussed above may be used as input to a behavior-time model. The contextual information may include the status of other objects in the environment, such as the states of traffic lights. In addition, features of other objects (such as vehicles) that might be crossing the objects' path may also be used as input to the model.

As noted above, the behavior-time model may provide a set of hypotheses each having an associated likelihood value. As an example, one or more of those hypotheses with the highest likelihoods (or those above a particular threshold such that a given hypothesis is considered to have a reasonable likelihood of occurrence) may be identified as an actual future trajectory or behavior prediction for the object over the predetermined period of time. For instance, the vehicle's computing devices may use a behavior-time model to generate a prediction of what an object will do during the next predetermined period of time (e.g. 10 seconds) or a time period corresponding to how long the vehicle 100 is likely to interact with the object (e.g. until the object is well behind the autonomous vehicle). Returning to FIG. 6, the computing devices 110 may predict that vehicle 601 is going to continue move towards and pass through intersection 604 according to trajectory 603.

According to the predicted trajectory, the route and trajectory are expected to intersect at point 680. As such, a constraint may be generated for vehicle 100 to avoid the point 680, at the point in time when vehicle 601 (or any portion of vehicle) is expected to overlap with point 680. Thus, the initial speed plan (or prior speed plan) may be adjusted such that the vehicle 100 is able to satisfy the constraint as well as any other constraints within the set of constraints. In other words, this constraint may cause vehicle 100 to adjust the initial speed plan (or prior speed plan), for instance in order to cause vehicle 100 to slow down or alternatively maintain its speed in order to avoid point 680 during the point in time at which trajectory 603 of vehicle 601 (or any portion of vehicle 601) is expected to overlap with point 680.

As another example, a constraint may be that at the particular point in time when the predicted trajectory crosses or comes within a predetermined distance of the route, the vehicle must come no closer than some distance from the object. Returning to FIG. 6, another constraint may be generated that prevents or limits vehicle from entering an area that is proximate to point 680 corresponding to area 690 that is within a predetermined distance, such as 3 meters or more or less, of point 680, during the period of time during which the trajectory 603 of vehicle 601 (or any portion of vehicle 601) is expected to overlap with area 690. Again, the initial speed profile may be adjusted such that the vehicle 100 is able to satisfy this constraint as well as any other constraints within the set of constraints. In other words, this constraint may cause vehicle 100 to adjust the initial speed plan (or prior speed plan), for instance in order to cause vehicle 100 to slow down or alternatively maintain its speed in order to avoid area 690 during the period of time during which the trajectory 603 of vehicle 601 (or any portion of vehicle 601) is expected to overlap with area 690.

In another example, where the vehicle is to make a left turn at an intersection, a constraint may be generated that requires the vehicle to yield to oncoming traffic or rather to not be in the lane of the oncoming traffic when that oncoming traffic is close to or crossing the route. In this regard, referring to FIG. 6, a constraint may be generated that limits vehicle from entering area 690 until vehicle 601 has completely cleared area 690, thereby yielding to vehicle 601. Again, the initial speed profile may be adjusted such that the vehicle 100 is able to satisfy this constraint as well as any other constraints within the set of constraints. In other words, this constraint may cause vehicle 100 to generate a speed plan for vehicle 100 to slow down and yield to vehicle 601.

As another example, a constraint may be that the vehicle must pass the other object by a certain point on the route and if not, the vehicle must not pass the other object, for instance, prior to reaching an exit ramp or to making a turn. For example, a vehicle may need to change from a first lane to a second lane in order to reach an exit ramp or make a turn. If another object is expected to be located within the second lane according to the predicted trajectory for that object, a constraint may be generated that the vehicle must pass the object within a predetermined distance, such as 50 or 100 meters or more or less, from the exit ramp or where the turn needs to be made. The predetermined distance may be selected based upon the current speed of the vehicle and/or the other object.

In addition or alternatively, the proximity of the vehicle to other moving or potentially moving objects may be used to generate constraints. For example, the vehicle may be restricted from traveling too fast next to other objects such as other vehicles, bicyclists, motorcycles, or pedestrians whether stopped (parked) or moving. If the other object is moving, such as where the vehicle is passing another object (such as other vehicles, bicyclists, motorcycles, or pedestrians) in an adjacent lane (or on the side of the lane in which the vehicle is currently traveling), a constraint may limit the speed of the vehicle to the speed of the other object plus some fixed number or percentage of the speed. In some examples, that fixed number could change depending on the speed of the other object and the lateral gap between the vehicle and the other object.

In yet other examples, constraints may be generated based on environmental conditions. For instance, a state of a traffic light signal may be used to generate a constraint for the vehicle. In this regard, a vehicle's location relative to a traffic light signal which is red or yellow may be used to generate a constraint that the vehicle must stop prior to an intersection. Again, this constraint may be used to adjust the initial speed plan (or prior speed plan). In some examples, it may be useful for the computing devices to "remember" environmental conditions, even where they do not persist into the next iteration. For instance, if a bicyclist makes a hand signal for a turn, even though the hand signal does not persist, it is important for the computing devices to consider this signal for generating constraints for future iterations. In this regard, such a signal may continue to be used to generate constraints for the next few seconds, for instance 3 seconds or more or less.

Still other constraints may be generated based on expected "comfort" of passengers within the vehicle. For instance, the constraints may include the hard physical limits to fore/aft and lateral deceleration and acceleration values of the vehicle which correspond to mechanical limit of the vehicle (i.e. how hard the brakes or accelerator can be applied by the deceleration system 160 or acceleration system 162 at any given time). However, because these physical limits can be uncomfortable to the passengers (causing the jerk described above), constraints may include "soft limits" which correspond to fore/aft and lateral deceleration and/or acceleration limits for the vehicle which correlate to a more comfortable experience for a passenger. Because these soft limits constraints are based in comfort, they may be treated differently than other constraints in that the computing devices may be able to violate such soft limits constraints when necessary, such as to avoid a collision or other dangerous situation.

As another constraint, a constraint may relate to the absolute minimum distance to another object to ensure the safety of the passenger, such as a headway distance (from the front of the vehicle to the object), a tailing distance (from the rear of the vehicle to the object), or lateral gap (lateral distance between the vehicle and the object). Again, because these physical limits, while still considered safe for the passenger, can be uncomfortable to passengers, additional soft limits constraints may include greater distance limits for the above than actually required for safety. In that regard, these soft limits constraints may also relate to the comfort or discomfort of pedestrians, bicyclists, motorcyclists, and passengers other vehicles as well as passengers of vehicle 100, and may be violated when necessary, such as to avoid a collision or other dangerous situation.

Other constraints may relate to how other objects are likely to respond to the speed or speed changes of the vehicle. For instance, additional soft limits constraints may correspond to fore/aft and lateral deceleration and/or acceleration limits for other objects, or really, other road users. This may correlate to a more comfortable experience for those other objects (or passengers within a vehicle if the object is a vehicle). In this regard, the speed plan of the vehicle would be constrained by a limit on the amount of deceleration and/or acceleration that the speed plan would require of other vehicles in order to satisfy all of the constraints of the set of constraints. Still further, such constraints may vary based upon whether the vehicle is within the field of view of that other object. In this regard, constraints corresponding to acceptable fore/aft and lateral deceleration and acceleration values of another object may be even lower where the vehicle is not within a field of view of that other object or in other words, is not within some angle range such as 50 degrees or more or less from the heading of the other object. Again, because these soft limits constraints are based in comfort, they may be treated differently than other constraints in that the computing devices may be able to violate such soft limits constraints when necessary, such as to avoid a collision or other dangerous situation.

As noted above, the constraints may cause the computing devices to adjust the initial speed plan (or prior speed plan). As an example, the initial speed plan (or prior speed plan) may be adjusted by iteratively decelerating and/or accelerating 1 mile per hour over the period of time for the initial speed plan (or prior speed plan) and determining whether all of the constraints of the set of constraints are satisfied. Once all of the constraints are satisfied, the adjusted speed plan may be used by the computing devices 110 to control the vehicle 100.

In some instances, there may be no adjustment to the prior speed plan that will satisfy all of the constraints of the set of constraints. If this occurs, the computing devices may revert to comparing an expected result if the vehicle were to return to the fastest possible speed with an expected result if the vehicle were to come to a complete stop. If the fastest possible speed would allow the vehicle to continue safely, in other words, without coming too close to any other objects or their predicted trajectories (i.e. other vehicles, bicyclists or pedestrians), the prior speed plan may be adjusted back to the fastest possible speed. If not, the vehicle may be brought to a complete stop. In other words, the computing devices may compare the relative penetration between the route and the predicted trajectory of another vehicle and select the option which will cause the least amount of overlap.

Figure 7:
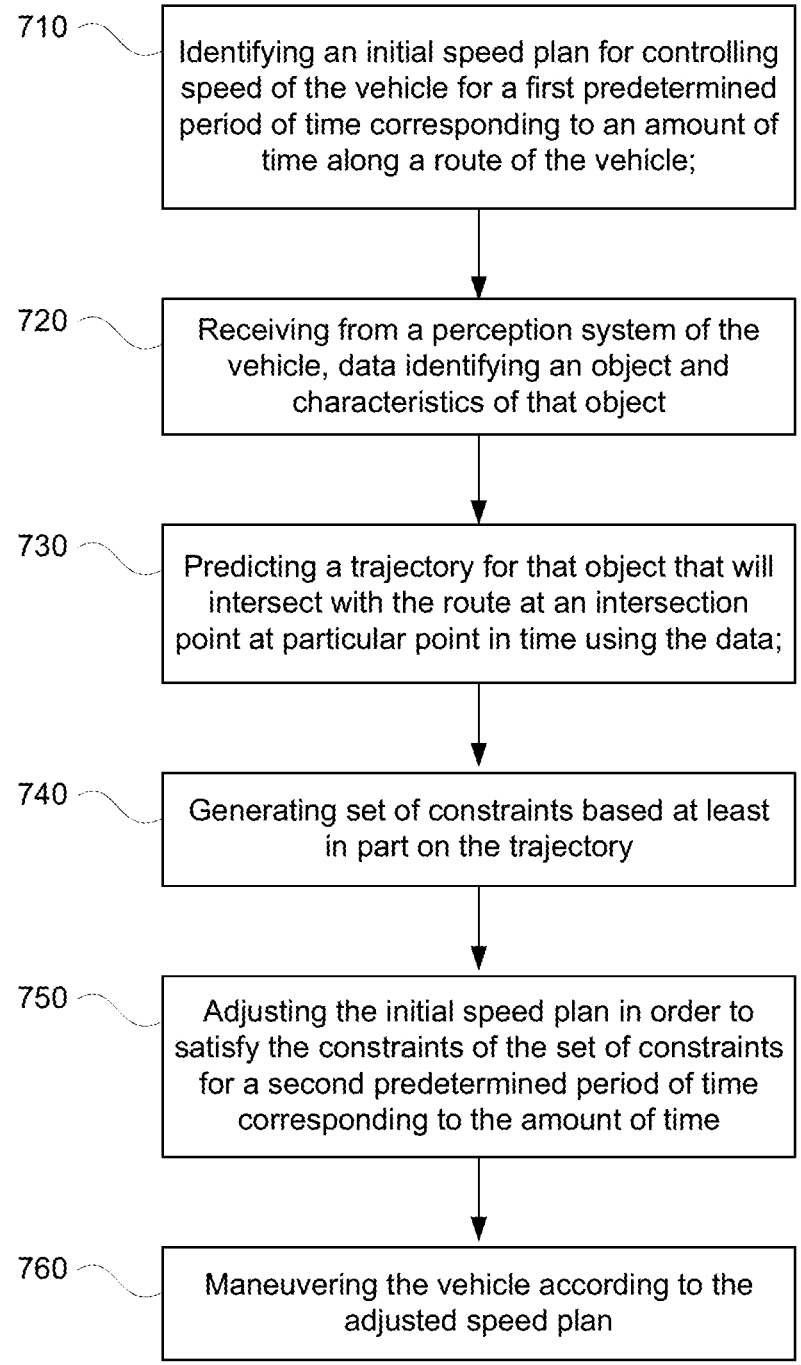
FIG. 7 is a flow diagram in accordance with aspects of the disclosure.

FIG. 7 is an example flow diagram 700 in accordance which may be performed by one or more computing devices of a vehicle, such as computing devices 110 of vehicle 100 in order to maneuver the vehicle 100 in an autonomous driving mode. In this example, an initial speed plan for controlling speed of the vehicle for a first predetermined period of time corresponding to an amount of time along a route of the vehicle is identified at block 710. Data identifying an object and characteristics of that object is received from a perception system of the vehicle at block 720. A trajectory for the object that will intersect with the route at an intersection point at particular point in time is predicted using the data at block 730. A set of constraints is generated based on at least the trajectory at block 740. The speed plan is adjusted in order to satisfy the set of constraints for a second predetermined period of time corresponding to the amount of time at block 750. The vehicle is maneuvered in the autonomous driving mode according to the adjusted speed plan at block 760.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
    evaluating, by one or more processors of a vehicle operating in an autonomous driving mode, one or more characteristics of an object detected in an external environment of the vehicle according to a behavior-time model;
    predicting, by the one or more processors, a set of trajectories for the object based on the evaluating of the one or more characteristics of the object;
    identifying, by the one or more processors, a set of constraints for vehicle operation based on the predicted set of trajectories; and
    adjusting a speed plan in order to satisfy one or more constraints of the set of constraints within a period of time that is associated with the speed plan, wherein adjusting the speed plan includes iteratively modifying a speed of the vehicle by a specific amount over at least part of the period of time.

2. The method of claim 1, wherein the behavior-time model is associated with a set of predictions for how the object could behave for at least a portion of the period of time.

3. The method of claim 2, wherein each prediction of the set of predictions includes a trajectory that defines a set of future locations where the object is expected to be at different times in the future corresponding to the period of time.

4. The method of claim 2, wherein the behavior-time model provides a corresponding likelihood value for each prediction of the set of predictions.

5. The method of claim 1, wherein the behavior-time model is part of a set of behavior-time models, each behavior-time model of the set of behavior-time models being designated for a particular type of object.

6. The method of claim 1, wherein predicting the set of trajectories for the object includes generating a set of possible hypotheses for what the object will do over at least a portion of the period of time.

7. The method of claim 1, wherein identifying the set of constraints for vehicle operation is further based on a type of driving action to be performed by the vehicle within the period of time.

8. The method of claim 7, wherein the type of driving action to be performed includes making a turn.

9. The method of claim 7, wherein the type of driving action to be performed includes passing the object.

10. The method of claim 9, wherein identifying the set of constraints includes identifying a speed at which the vehicle can pass the object.

11. The method of claim 10, wherein the speed at which the vehicle can pass the object is variable based on at least one of a speed of the object or a lateral gap between the vehicle and the object.

12. The method of claim 1, wherein identifying the set of constraints for vehicle operation is further based on a comfort criteria associated with a passenger of the vehicle.

13. The method of claim 1, wherein the set of constraints includes a constraint based on either a traffic sign or a traffic signal.

14. The method of claim 13, wherein the speed plan is adjusted based on a state of the traffic signal.

15. The method of claim 1, wherein predicting the set of trajectories for the object is further based on one or more features of another moving object that is predicted to cross a path of the object.

16. The method of claim 1, wherein the one or more constraints include at least one soft limit constraint.

17. The method of claim 16, wherein the at least one soft limit constraint includes a distance limit corresponding to either comfort of a passenger of the vehicle or discomfort of another road user.

18. The method of claim 1, wherein the one or more constraints include at least one hard physical limit constraint.

19. A system comprising one or more processors of a vehicle configured to:
evaluate, in an autonomous driving mode, one or more characteristics of an object detected in an external environment of the vehicle according to a behavior-time model;
predict a set of trajectories for the object based on the evaluating of the one or more characteristics of the object;
identify a set of constraints for vehicle operation based on the predicted set of trajectories; and
adjust a speed plan in order to satisfy one or more constraints of the set of constraints within a period of time that is associated with the speed plan, wherein the adjustment of the speed plan includes iterative modification of a speed of the vehicle by a specific amount over at least part of the period of time.

20. The system of claim 19, wherein the behavior-time model is associated with a set of predictions for how the object could behave for at least a portion of the period of time.

21. The system of claim 19, wherein the behavior-time model is part of a set of behavior-time models, each behavior-time model of the set of behavior-time models being designated for a particular type of object.

22. The system of claim 19, wherein prediction of the set of trajectories for the object includes generation of a set of possible hypotheses for what the object will do over at least a portion of the period of time.

23. The system of claim 19, wherein identification of the set of constraints for vehicle operation is further based on a type of driving action to be performed by the vehicle within the period of time.

24. The system of claim 19, wherein identification of the set of constraints for vehicle operation is further based on a comfort criteria associated with a passenger of the vehicle.

* * * * *